United States Patent [19]

Kawata

[11] Patent Number: 5,261,034
[45] Date of Patent: Nov. 9, 1993

[54] GRAPHICS MICROCOMPUTER FOR GENERATING GEOMETRIC FIGURES

[75] Inventor: Tetsuro Kawata, Kanagawa, Japan

[73] Assignee: Fuji Xerox Co., Ltd., Tokyo, Japan

[21] Appl. No.: 747,709

[22] Filed: Aug. 20, 1991

[30] Foreign Application Priority Data

Aug. 21, 1990 [JP] Japan ................... 2-220920

[51] Int. Cl.$^5$ ............................. G06F 15/62
[52] U.S. Cl. .................. 395/143; 395/142; 395/133
[58] Field of Search ............ 395/102, 105, 114, 133, 395/138-139, 141-143

[56] References Cited

U.S. PATENT DOCUMENTS 4,149,165  4/1979  Herman et al. ............... 395/114 X

OTHER PUBLICATIONS

"Algorithm for Computer Control of a Digital Plotter", by J. E. Bresenham, pp. 24-30 (1965).
"An Analysis of Floating-Point Addition", by D. W. Sweeney, p. 30 (1965).
"A Linear Algorithm for Incremental Digital Display of Circular Arcs", by Jack Bresenham, pp. 100-106 for IBM Systems Communications Division (1977).
"Curves and Surfaces" pp. 309-331 (1988).
"A High Speed Outline Font Rasterizing LSI" by Naoyuki Kai, Tsutomu Minagawa, Ichiro Nagashima and Ichiro Ohhashi (1989).

Primary Examiner—Gary V. Harkcom
Assistant Examiner—Almis Jankus
Attorney, Agent, or Firm—Finnegan, Henderson, Farabow, Garrett & Dunner

[57] ABSTRACT

A small size graphic microcomputer provided with a direction control circuit and a coordinate computing circuit, which allow for finer control over the direction in which a dot of interest is moving. The sequence of operations from the calculation of coordinates through address generation is carried out sequentially so that addresses in the drawing memory can be obtained at high speed in response to each output clock.

3 Claims, 7 Drawing Sheets

FIG. 7
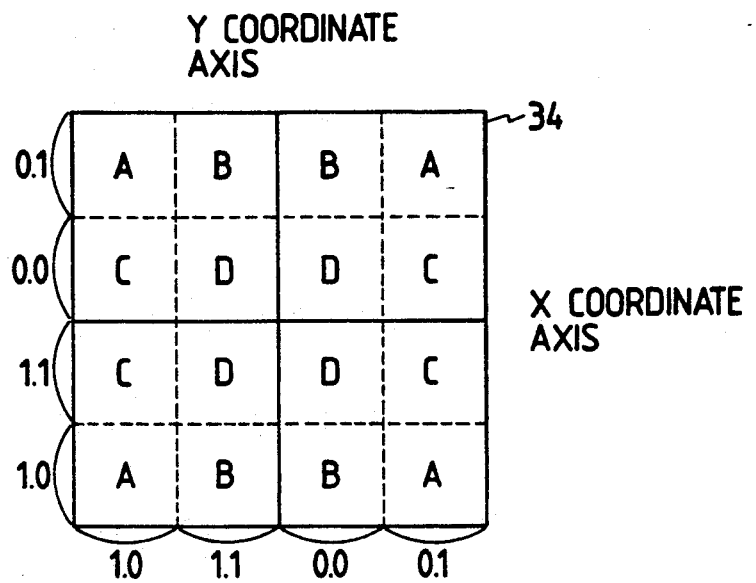
FIG. 8
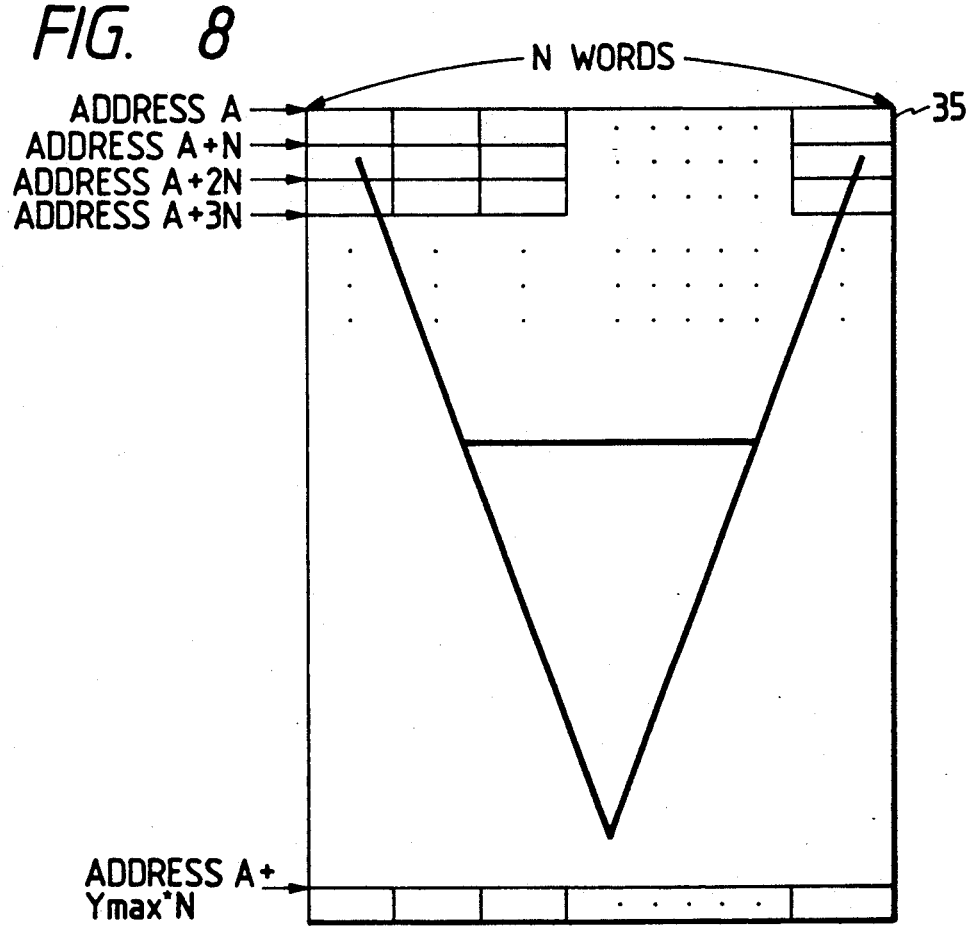
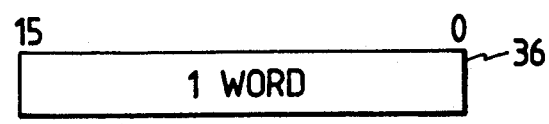

GRAPHICS MICROCOMPUTER FOR GENERATING GEOMETRIC FIGURES

BACKGROUND OF THE INVENTION

This invention relates to a graphics microcomputer which performs graphical processing.

With the increase in the resolution achievable by output devices such as laser beam printers and display terminals, the volume of data processing for generating geometric figures and characters is constantly growing and correspondingly high-speed processing is desired. Data processing for this purpose is often implemented by graphics systems that use general-purpose microcomputers or by systems that use graphic microcomputers which are exclusively used for drawing geometric figures. Graphic operations that are to be implemented with those systems include the drawing of straight-line segments and curved segments, as well as the development of vector character fonts.

In drawing straight-line segments and curved segments by the graphics systems mentioned above, so-called "incremental" drawing algorithms are used which compute the increments of coordinates with respect to the point drawn just previously. To mention a few examples, Bresenham's algorithm using a DDA (digital differential analyzer) is frequently employed in drawing straight-line segments (Bresenham, J. E.; "Algorithm for Computer control of a Digital Plotter", IBM Syst. J., 4(1), pp. 25–30, 1965). Bresenham's DDA algorithm for arcs of circles is frequently employed in drawing circles and circular arcs (Bresenham, J. E.; "A Linear Algorithm for Incremental Digital Display of Circular Arcs", "CACM, 20(2), pp. 100–106, 1977). An algorithm by a differential method is known in the field of drawing Bezier curves (Newman, W. M. and Sproul, R. F.; "Principles of Interactive Computer Graphis", 2nd ed., McGraw-Hill Kougakusha, Ltd., pp. 309–331, 1979). The graphics systems described above take unduly long time if the central processing unit (CPU) is software-oriented in drawing line segments, so the necessary operations are often executed with hardware. But in this case, different drawing algorithms are used for drawing different line segments, so separate hardware is required for each of the drawing algorithms employed and the overall hardware becomes bulky as shown in FIG. 1, in which the numeral 1 denotes a CPU, the numeral 100 denotes a DDA circuit for Bresenham's straight lines, the numeral 101 denotes 101 is a DDA circuit for Bresenham's circles, the numeral 102 denotes 102 is a circuit for Bezier curves, the numeral 103 denotes a multiplexer, the numeral 104 denotes an address generating circuit, and the numeral 13 denotes a CPU interface bus. CPU 1 controls DDA circuits 100 and 101 and circuit 102. Circuits 100, 101 and 102 output a direction of movements with respect to the dot drawn just previously. The multiplexer 103 selects either one of the outputs from circuits 100, 101 and 102 and sends it to the address generating circuit 104. The address generating circuit 104 generates the address of a word containing the dot to be drawn next. An example of such graphics system that incorporates a dedicated circuit for each of the different drawing algorithms to be implemented is described in Kai, N. et al.; "A High-Speed Outline Font Rastering LSI", IEEE 1989 CICC Proceedings, 24.6, May 1989.

SUMMARY OF THE INVENTION

An object of the present invention is to provide a graphics micro-computer that is smaller in size but that yet is capable of drawing various kinds of line segments.

To attain this object, the graphics microcomputer of the present invention expresses the X coordinate Px and Y coordinate Py of any point P on all curves and straight lines by the following polynomials:

$$P_x(t) = A_N * t^N + A_{N-1} * t^{N-1} + \ldots + A_1 * t + A_0 \quad (1)$$

$$P_y(t) = B_N * t^N + B_{N-1} * t^{N-1} + \ldots + B_1 * t + B_0 \quad (2)$$

where $A_N, A_{N-1}, \ldots B_O$ are constants, t is a parameter that satisfies the condition $0 \leq t \leq 1$, and N, which is the degree of a curve, takes on a positive integer. The microcomputer comprises: an Nth-order polynomial computing circuit that computes consecutively the values of Px and Py in response to each output clock and outputs the computed values; latch circuits in which the values of Px and Py produced from the Nth-order polynomial computing circuit are latched for one period of output clock before they are outputted; a direction control circuit that receives the values of Px and Py from the Nth-order polynomial computing circuit and those values of Px and Py which have been delayed for one period of output clock and the determines the direction of movement within dot units in accordance with prescribed rules; and an address generating circuit that receives the direction of movement as an output from the direction control circuit and that computes, in response to each output clock, the address of a word containing the dot to be written in. The aforementioned object of the present invention is attained by setting the constants for the Nth-order polynomial computing circuit and performing computation in accordance with the kind of the specific straight line or curve to be drawn.

BRIEF DESCRIPTION OF THE DRAWINGS

In the accompanying drawings:

FIG. 7 is a diagram showing how input coordinates are classified; and

FIG. 8 is a diagram showing a composition of a drawing memory.

DESCRIPTION OF THE PREFERRED EMBODIMENTS

Figure 1:
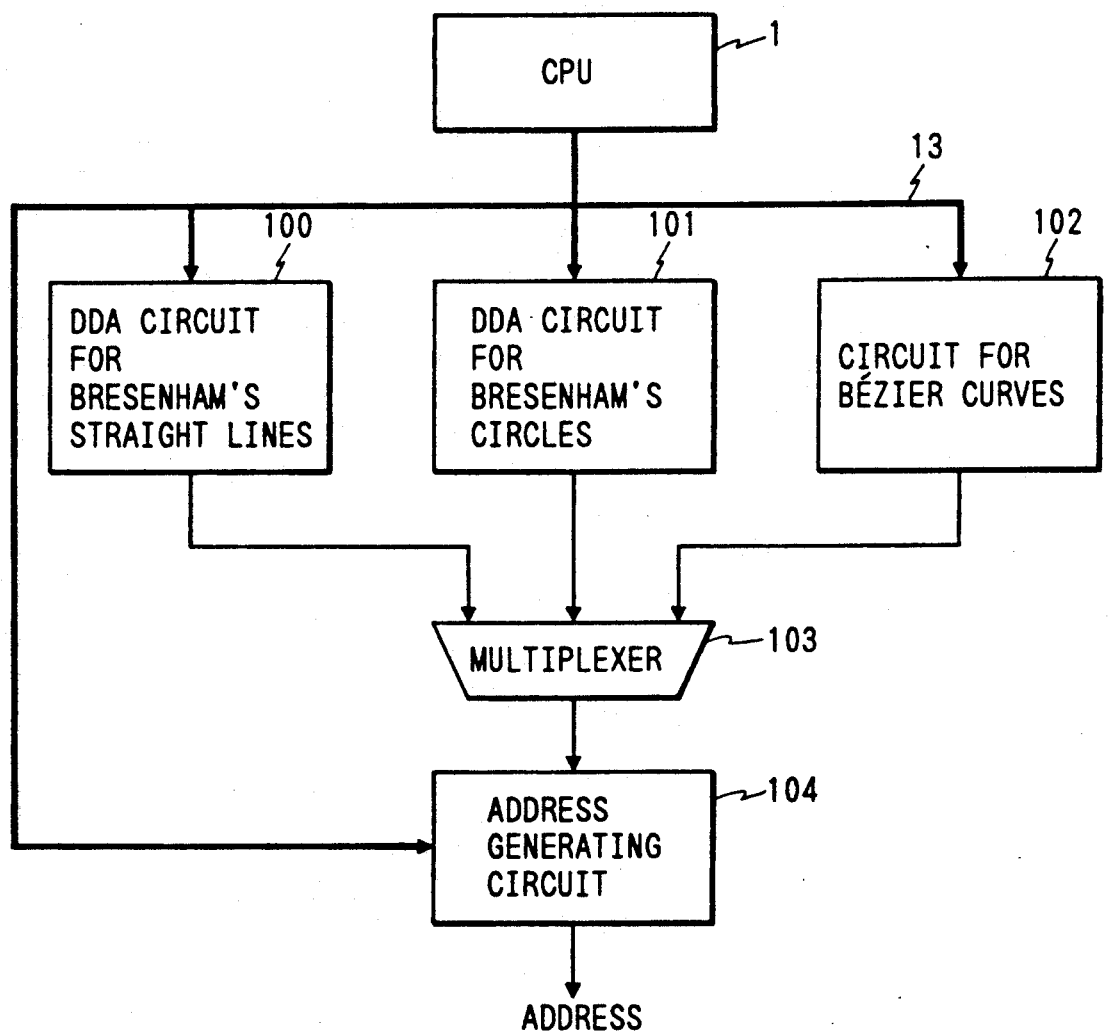
FIG. 1 is a block diagram of a prior art graphics microcomputer.
Figure 2:
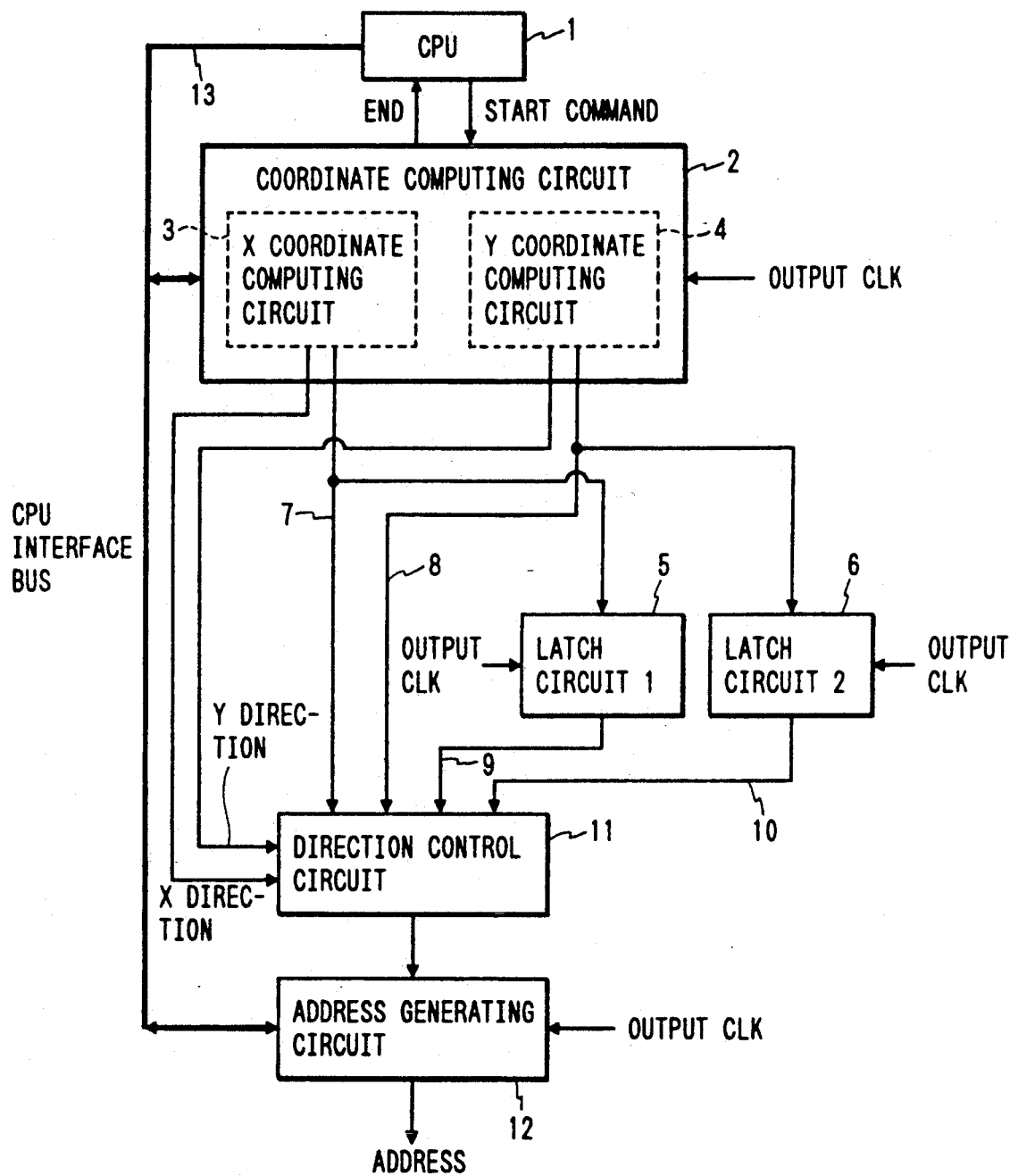
FIG. 2 is a block diagram of an embodiment of the graphics microcomputer of the present invention.

FIG. 2 is a block diagram of an embodiment of the graphics microcomputer of the present invention. The embodiment of FIG. 2 comprises a CPU (central processing unit) 1, a coordinate computing circuit 2, an X coordinate computing circuit 3, a Y coordinate computing circuit 4, a first latch circuit 5, a second latch circuit 6, a signal line 7 to be supplied with a new X coordinate $P_{NX}$, a signal line 8 to be supplied with a new Y coordinate $P_{NY}$, a signal line 9 to be supplied with the old X coordinate $P_{OX}$, a signal line 10 to be supplied with the old Y coordinate $P_{OY}$, a direction control circuit 11, an address generating circuit 12, and a CPU interface bus 13.

The graphics microcomputer shown in the block diagram of FIG. 2 will operate in the following manner.

(i) CPU 1 as connected to CPU interface bus 13 sets initial values for the X coordinate computing circuit 3, Y coordinate computing circuit 4, and the registers in the address generating circuit 12. The registers to be initialized and the initial values to be set will be described later in this specification.

(ii) In the next step, CPU 1 instructs the coordinate computing circuit 2 to start computing. In response to each output clock, the X coordinate computing circuit 3 and the Y coordinate computing circuit 4 supply a new X coordinate $P_{NX}$ and a new Y coordinate $P_{NY}$ to signal lines 7 and 8, respectively. At the same time, the circuits 3 and 4 supply the direction control circuit 11 with signals X DIRECTION and Y DIRECTION, respectively, which indicate whether the new X and Y coordinates are moving in a positive or negative direction. The first latch circuit 5 and the second latch circuit 6 are supplied with the values of signal lines 7 and 8, respectively, in response to each output clock and output those values, after a delay of one output clock, to signal lines 9 and 10 as old X coordinate $P_{OX}$ and old Y coordinate $P_{OY}$, respectively.

(iii) The direction control circuit 11 is supplied with the values of signal lines 7, 8, 9 and 10 and the directions of movements with respect to X and Y coordinates and, in response to each output clock, the circuit outputs the direction in which the new coordinate should move. The output refers to either one of the directions associated with the 8 surrounding dots that are adjacent the dot of the old coordinates, or it refers to non-movement. Since the curve or straight line to be drawn must have continuity between dots, the following relationships must hold:

$$|P_{NX}-P_{OX}| \leq 1 \quad (3)$$

$$|P_{NY}-P_{OY}| \leq 1 \quad (4)$$

(iv) The address generating circuit 12 receives the output of the direction control circuit 11 and computes, in response to each output clock, the address of a drawing memory word containing the dot of the new coordinates and outputs the computed address.

(v) After steps (i)–(iii), the coordinate computing circuit 2 informs the CPU 1 of the end of processing.

This is an outline of the operation of the circuit shown in the block diagram of FIG. 2.

The internal compositions of the coordinate computing circuit 2, the direction control circuit 11 and the address generating circuit 12 and their operations are described below in detail.

Coordinate Computing Circuit

Figure 3:
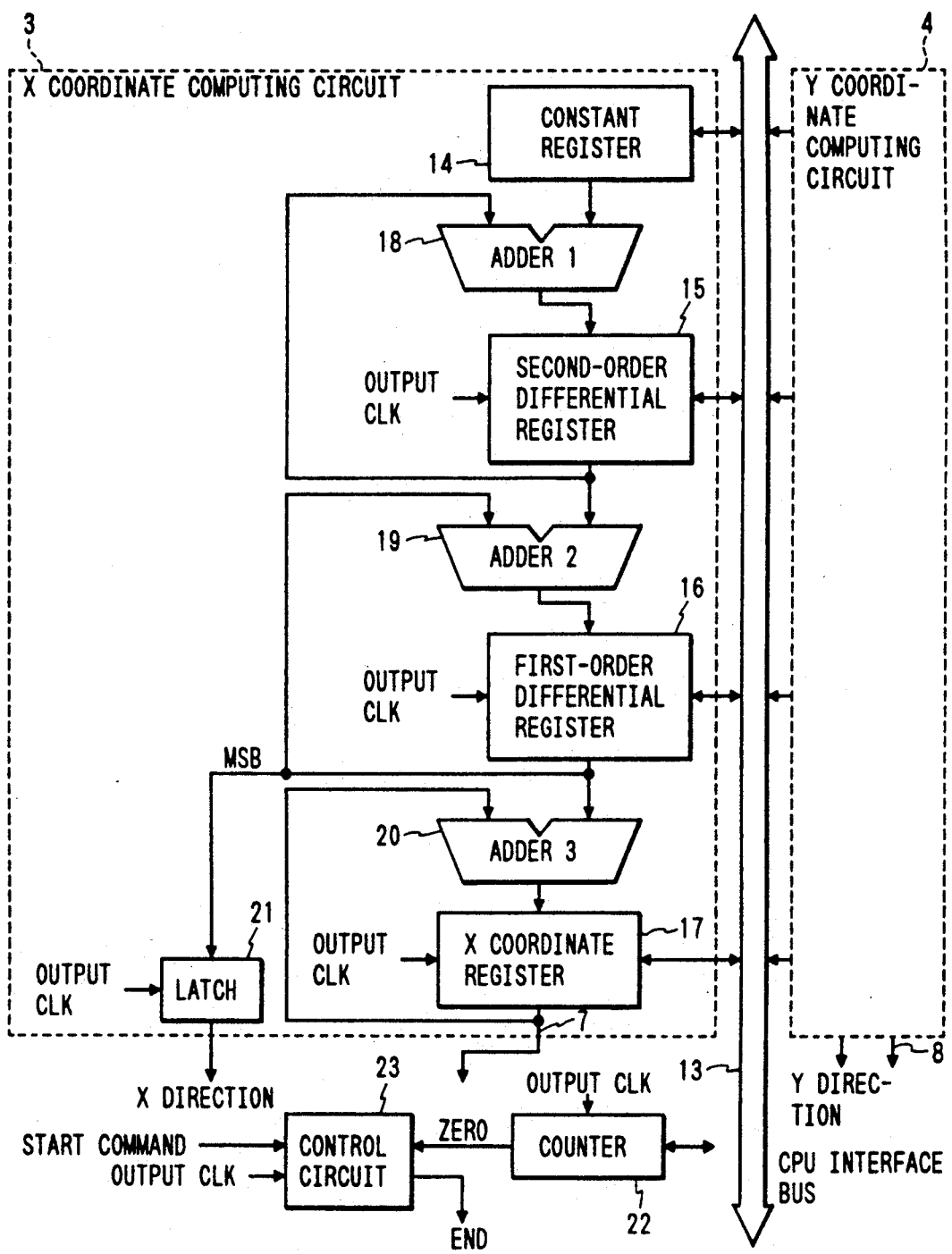
FIG. 3 is a block diagram of a coordinate computing circuit in the graphics microcomputer of the present invention.

FIG. 3 is a block diagram showing the internal composition of the coordinate computing circuit 2. Although the coordinate computing circuit 2 includes both X coordinate computing circuit 3 and Y coordinate computing circuit 4, they have the same composition and operate in the same manner, so the following description concerns only the X coordinate computing circuit 3. The composition of the coordinate computing circuit shown in FIG. 3 is based on the case where N (the degree of curve) is 3 in Relations (1) and (2), which can be rewritten as:

$$Px(t)=A_3*t^3+A_2*t^2+A_1*t+A_0 \quad (5)$$

$$Py(t)=B_3*t^3+B_2*t^2+B_1*t+A_0 \quad (6)$$

By these two equations, line segments of $N \leq 3$, namely, a cubit curved segment, a quadratic curved segment and a straight-line segment, can be expressed.

FIG. 3 shows the X coordinate computing circuit 3; the Y coordinate computing circuit 4; the signal line 7 to be supplied with a new X coordinate $P_{NX}$; a constant register 14; a second-order differential register 15; a first-order differential register 16; an X coordinate register 17; a first adder 18; a second adder 19; a third adder 20; a latch circuit 21; a counter 22; and a circuit 23 for controlling the coordinate computing circuits. The counter 22 and the control circuit 23 are shared by both the X coordinate computing circuit 3 and the Y coordinate computing circuit 4. The first adder 18 receives the values of the constant register 14 and the second-order differential register 15 and outputs the result of addition to the second-order differential register 15. The second adder 19 receives the values of the second-order differential register 15 and the first-order differential register 16 and outputs the result of addition to the first-order differential register 16. The third adder 20 receives the values of the first-order differential register 16 and the X coordinate register 17 and outputs the result of addition to the X coordinate register 17. The latch circuit 21 receives a code bit which is the MSB (most significant bit) of the first-order differential register 16, holds its value for the cycle period of one output clock, and outputs an X direction signal that indicates the direction of movement of a new X coordinate. The X coordinate register 17 outputs the held value to the signal line 7.

The circuit shown in FIG. 3 operates in the following manner. Before the start of coordinate computation, the CPU 1 initializes the constant register 14, second-order differential register 15, first-order differential register 16, X coordinate register 17 and counter 22 via the CPU interface bus 13. The respective initial values are as follows:

constant register 14: $6A_3n^3$
second-order differential register 15: $2A_2/n^2$
first-order differential register 16: $A_1/n$
X coordinate register 17: $A_0$
counter 22: n In order to satisfy the relations (3) and (4), the initial value n to be set in counter 22 must be equal to or greater than the number of dots to be drawn. On the other hand, the drawing time is proportional to n: In other words, if n is too large, the displacement of coordinates that occur during one cycle of computation will take on a much smaller value than one dot, so many cycles of computation will be wasted without casing dot displacements. Therefore, the appropriate value of n is preferably the smallest possible number that is equal to or greater than the number of dots to be drawn. The registers in the Y coordinate computing circuit 4 are initialized in a similar manner.

Figure 6:
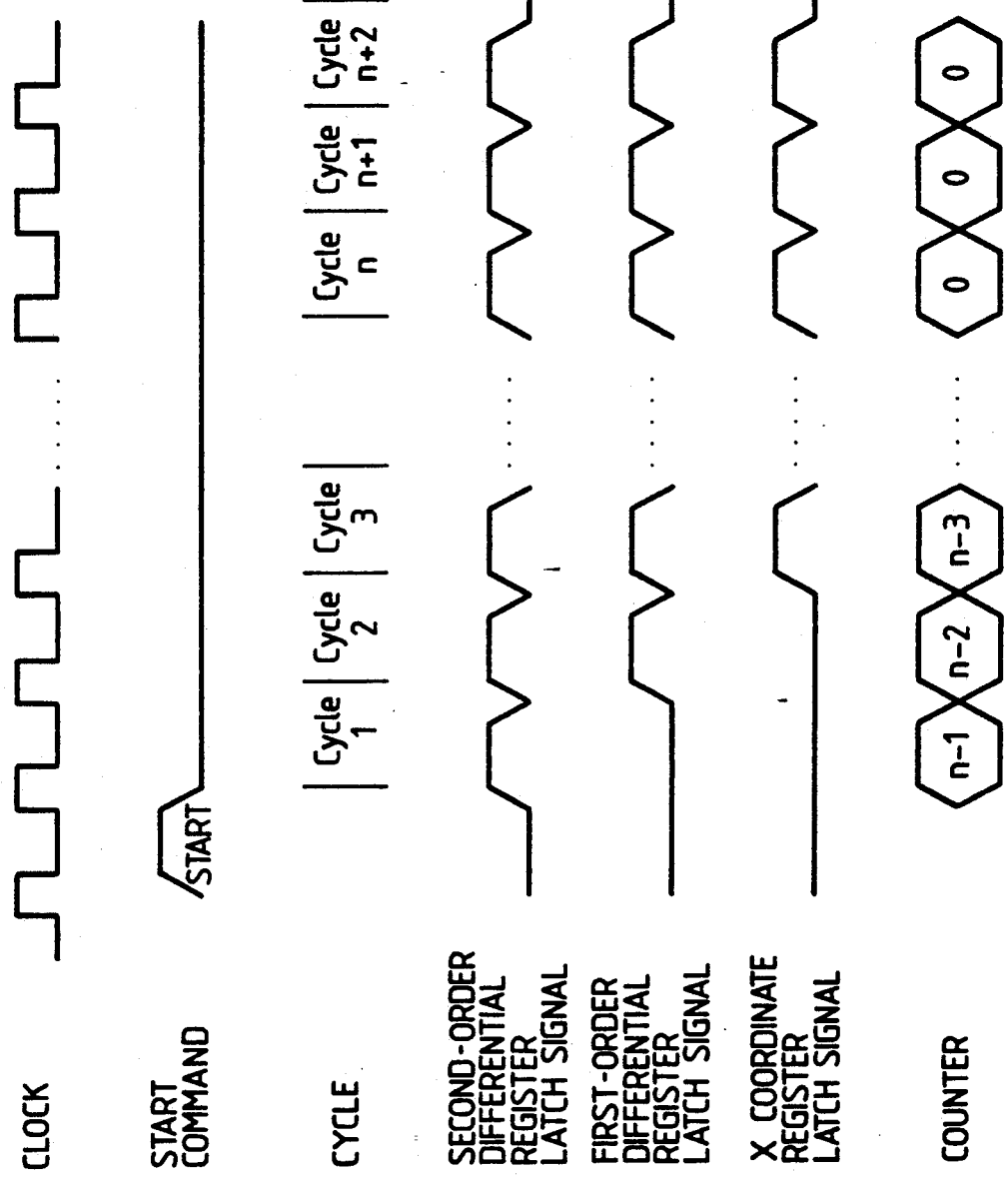
FIG. 6 is a timing chart for the operation of an X-coordinate computing circuit shown in FIG. 3.

In the next step, the CPU 1 instructs the X coordinate computing circuit 3 to start computing. The start command signal is fed into the control circuit 23, which subsequently controls the computation to be performed by the X coordinate computing circuit 3. FIG. 6 is a timing chart showing the operation of the X coordinate computing circuit 3. In a computing cycle 1, which is the output clock cycle immediately following the outputting of the start command signal, the second-order differential register 15 latches the output of the first adder 18. In a subsequent computing cycle 2, the second-order differential register 15 and the first-order differential register 16 latch the outputs of the first adder 18 and the second adder 19, respectively. In a computing cycle 3 and subsequent cycles, the second-order differential register 15, the first-order differential register 16 and the X coordinate register 17 latch the outputs of the first adder 18, the second adder 19 and the third adder 20, respectively. In the meantime, the counter 22 has reduced its value in decrements of "1" for each output clock cycle. In a computing cycle n, the value of the counter 22 becomes zero. After receiving a signal ZERO which informs that the value of counter 22 is zero, the control circuit 23 permits the second-order differential register 15, the first-order differential register 16 and the X coordinate register 17 to continue to latch the outputs of the first adder 18, the second adder 19 and the third adder 20, respectively, until a computing cycle (n+2), whereupon the computation in the X coordinate computing circuit 3 ends. Thus, during computing cycles 3 and (n+2), the X coordinate computing circuit 3 outputs n X coordinates and n X direction signals each denoting the direction of movement of X coordinate. The control circuit 23 outputs a signal notifying the end of the coordinate computing operations.

Direction Control Circuit

The direction control circuit 11 receives the freshly computed coordinates $P_{NEW}(P_{NX},P_{NY})$, the old coordinates $P_{OLD}(P_{OX},P_{OY})$ which were computed in a just preceding cycle, the X direction signal and the Y direction signal and outputs the direction in which a dot of interest should move.

(i) Transformational Procedure

While various transformational rules can be conceived for obtaining outputs from the inputs $P_{NX}$, $P_{NY}$, $P_{OX}$ and $P_{OY}$, a representative rule is described below with reference to FIG. 7 and Table 1. First, the symbols that denote input and output signals are described. Of the various values that can be assumed by each of the inputs $P_{NX}$, $P_{NY}$, $P_{OX}$ and $P_{OY}$, the value which is one bit to the left of the decimal point and the value which is one bit to the right of the decimal point are the only values that are necessary in the rule to be discussed herein. The values which are two bits to the right of the decimal point and smaller values shall be truncated. Hence, the values of the respective inputs can be expressed by:

$$P_{NEW}(P_{NX}, P_{NY}) = (nx0.nx1, ny0.ny1)$$

$$P_{OLD}(P_{OX}, P_{OY}) = (ox0.ox1, oy0.oy1)$$

where $P_{NX}$, $P_{NY}$, $P_{OX}$ and $P_{OY}$ are all written in binary notation; nx0, ny0, ox0 and oy0 denote values which are one bit to the left of the decimal point; and nx1, ny1, ox1 and oy1 denote values which are one bit to the right of the decimal point ("." denotes the decimal point). The X and Y direction signals are expressed by X_Dir and Y_Dir, respectively, and each of them denotes "positive" if they are "1" and "negative" if they are "0". The direction control circuit 11 produces the following output signals (their symbols are shown together with definitions):

X_Plus: move a dot in the direction of X axis by increment "1"

X_Minus: move a dot in the direction of X axis by increment "−1"

Y_Plus: move a dot in the direction of Y axis by increment "1"

Y_Minus: move a dot in the direction of Y axis by increment "−1"

where X_Plus signal and X-Minus signal will not be active at the same time, and Y_Plus signal and Y_Minus signal also will not be active at the same time.

FIG. 7 shows how input coordinates are classified. In FIG. 7, numeral 34 denotes a 4-dot grid, with the individual dot units being bounded by solid lines. The 4-dot grid is divided into 16 regions by dashed lines which are border lines between 0.5-dot units, with those 16 regions being denoted by A-D. Relations (3) and (4) are assumed to hold in the present discussion, the maximum distance of movement of X and Y coordinates is one dot. Consequently, the coordinates $P_{NEW}(P_{NX},P_{NY})$ and the coordinates $P_{OLD}(P_{OX},P_{OY})$ can be related by movements within the region of four dots shown in FIG. 7. For example, if the inputs in a certain cycle are $$P_{NEW}(P_{NX}, P_{NY}) = (0.0, 0.0)$$

$$P_{OLD}(P_{OX}, P_{OY}) = (1.1, 1.0)$$

the movement of the coordinates is from region B of the lower left dot in FIG. 7 to region D of the upper right dot. All combinations of movements between dot regions and the outputs in response to the values of direction signals X and Y are listed in Table 1 below.

TABLE 1

| Combinations of areas where coordinates before and after movements belong (coordinates before movement → coordinates after movement) | X_Dir, Y_Dir ("—" means "don't" care) | Values of output signals (X_Plus, Y_Minus) |
|---|---|---|
| A→A,B→B,C→C,D→D | —,— | 0,0,0,0 |
| A→B,B→A,C→D,D→C | 0,— | 1,0,0,0 |
| A→B,B→A,C→D,D→C | 1,— | 0,1,0,0 |
| A→C,C→A,B→D,D→B | —,0 | 0,0,1,0 |
| A→C,C→A,B→D,D→B | —,1 | 0,0,0,1 |
| A→D,D→A,B→C,C→B | 0,0 | 1,0,1,0 |
| A→D,D→A,B→C,C→B | 1,0 | 0,1,1,0 |
| A→D,D→A,B→C,C→B | 0,1 | 1,0,0,1 |
| A→D,D→A,B→C,C→B | 1,1 | 0,1,0,1 |

On the basis of Table 1, the respective output signals can be expressed as follows:

$$X\_Plus = \sim X\_Dir*((nx0 \wedge nx1) \wedge (ox0 \wedge ox1))$$

$$X\_Minus = X\_Dir*((nx0 \wedge nx1) \wedge (ox0 \wedge ox1))$$

$$Y\_Plus = \sim Y\_Dir*((ny0 \wedge ny1) \wedge (oy0 \wedge oy1))$$

$$Y\_Minus = Y\_Dir*((ny0 \wedge ny1) \wedge (oy0 \wedge oy1))$$

where "$\sim$", "*" and "$\wedge$" denote NOT, AND, and exclusive or, respectively.

(ii) Direction Control Circuit

Figure 4:
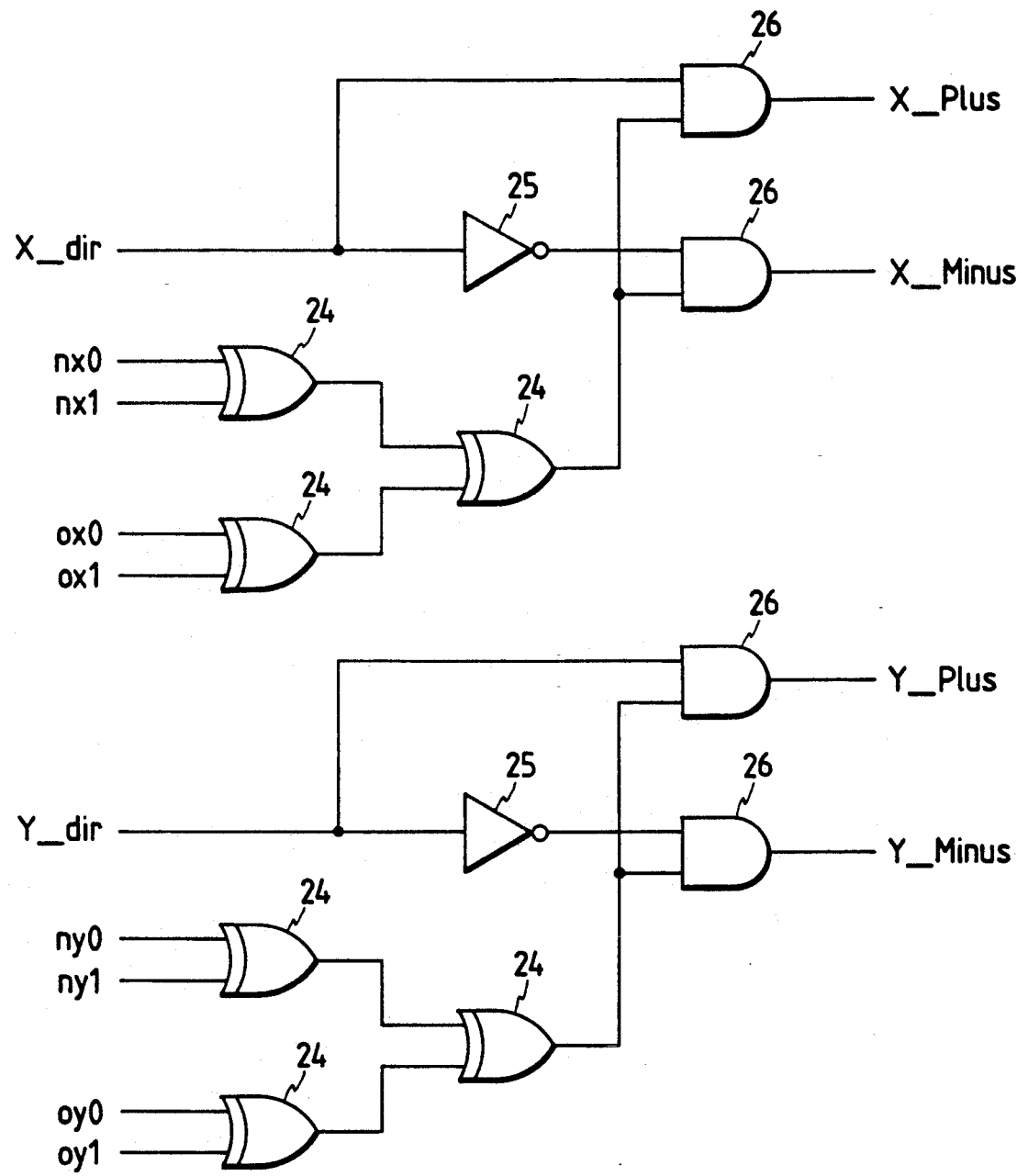
FIG. 4 is a block diagram of a direction control circuit in the graphics microcomputer of the present invention.

The configuration of the direction control circuit 11 is shown in FIG. 4. Circuit 11 includes an exclusive OR gate 24, an inverter 25, and an AND gate 26. The exclusive OR gate 24 receives two inputs and supplies their exclusive logical sum as an output. The inverter 25 receives one signal and outputs its negation. The AND gate 26 receives two signals and outputs their logical product.

Address Generating Circuit

Figure 5:
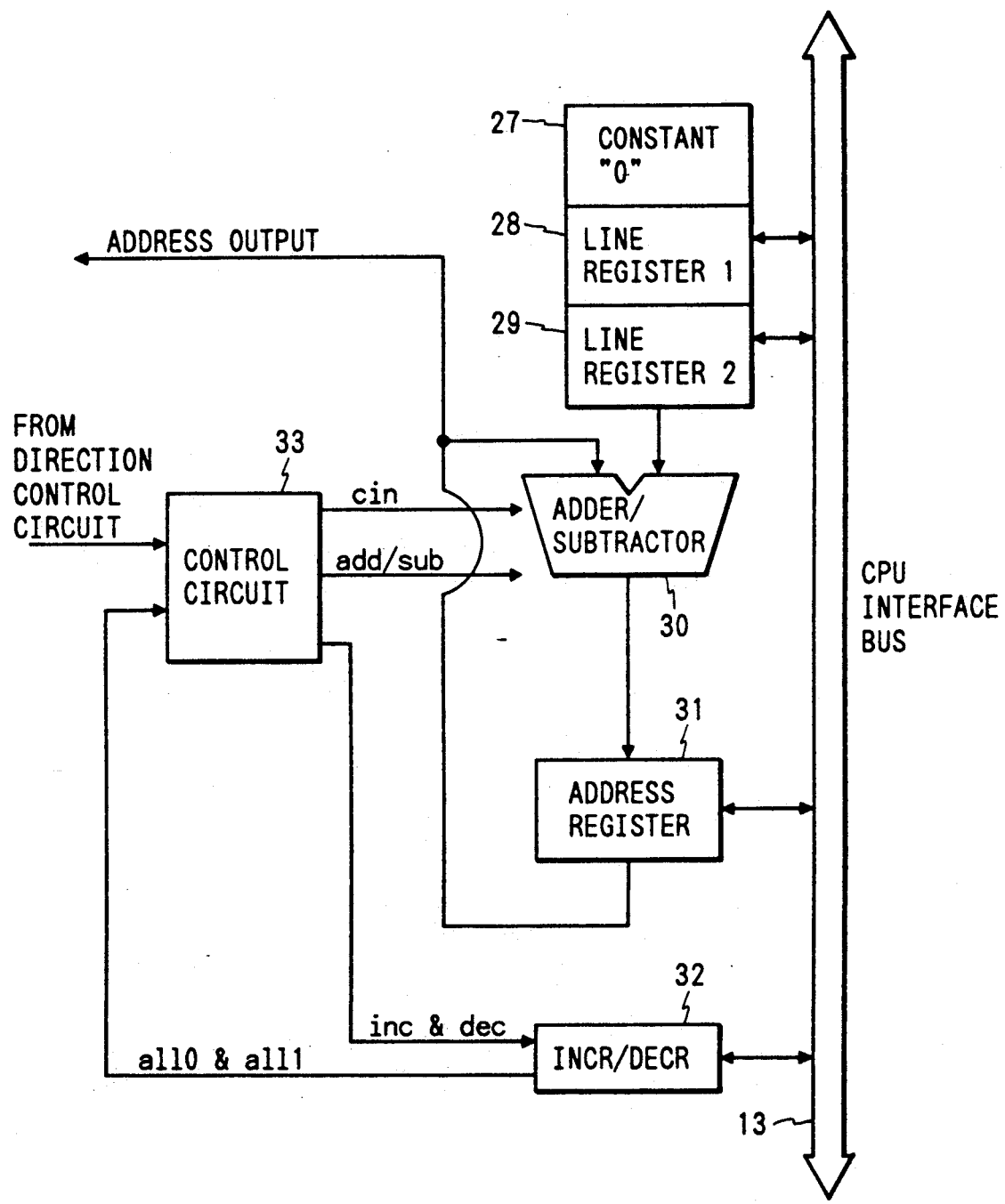
FIG. 5 is a block diagram of an address generating circuit in the graphics microcomputer of the present invention.

FIG. 5 shows the internal configuration of the address generating circuit 12. As shown it comprises a constant register 27, a first line register 28, a second line register 29, an adder/subtractor 30, an address register 31, an incrementer/decremeter 32, and a control circuit 33. The value of the constant register 27 is fixed at zero. Each of the first line register 28, the second line register 29, the address register 31 and the incrementer/decrementer 32 is capable of writing in or reading out data via the CPU interface bus 13. The output of the address register 31 is not only supplied to an external circuit but also connected to the first input of the adder/subtractor 30. One of the constant register 27, the first line register 28 and the second line register 29 is selectively connected to the second output of the adder/subtractor 30. The adder/subtractor 30 performs mathematical operations on the basis of two control signals supplied from the control circuit 33 and outputs the result of computation to the address register 31. The two control signals are a carry signal Cin and an add/sub signal. If the add/sub signal is active, the adder/subtractor 30 adds the first and second inputs; if the add/sub signal is inactive, the adder/subtractor 30 subtracts the second input from the first input. The incrementer/decrementer 32 receives an INC and a DEC signal from the control circuit 33; if the INC signal is active, the value to be held is incremented by one and held by the incrementer/decrementer 32, and if the DEC signal is active, the value to be held is decremented by one and held by the incrementer/decrementer 32. Otherwise, the incrementer/decrementer 32 does nothing. If all the bits in the held value are one, the incrementer/decrementer 32 produces an active all 1 signal. If all the bits in the held value are zero, the incrementer/decrementer 32 products an active all 0 signal. The control circuit 33 receives the output from the direction control circuit 11, as well as the all 0 and all 1 signals from the incrementer/decrementer 32, and supplies a carry signal and an ADD-/SUB signal to the adder/subtractor 30. The control circuit 33 which outputs an INC and a DEC signal to the incrementer/decrementer 32 also generates various control signals.

Before describing how addresses are generated from the output of the direction control circuit 11, let us briefly explain the correspondence between the X-Y coordinates and the drawing memory. The composition of the drawing memory is shown in FIG. 8. It is assumed here that the coordinates (X,Y) are subject to limitations $X \geq 0$ and $Y \geq 0$. Shown in FIG. 8 is the drawing memory 35, and a word 36 composed of 16 bits. The character "A" is drawn in the drawing memory 35. The drawing memory shown in FIG. 8 is linear (connected one-dimensionally) and the coordinates (0,0) correspond to bit 15 in start address A of the drawing memory. Similarly, the coordinates (1,0), (2,0), ..., (15,0) correspond to bits 14, 13, ..., 0 in address A. The coordinates (16,0) correspond to bit 15 in address (A+1). Further, coordinates (17,0), (18,0), 000, (31,0) correspond to bit 14, 13, ..., 0 in address (A+1). If the maximum value of the X coordinate is written as Xmax, the coordinates (Xmax, 0) correspond to bit 0 in address (A+N+1). Hence, one line consists of N words. The first and last coordinates of the second line, (0,1) and (Xmax,1), respectively correspond to bit 15 in address (A+N) and bit 0 in address (A+2*N−1). The same reasoning applies in subsequent states and, if the maximum value of the Y coordinate is written as Ymax, the first and last coordinates of the (Ymax−1)th line, (O,Ymax) and (Xmax,Ymax), respectively correspond to bit 15 in address (A+Ymax*N) and bit 0 in address (A+-(Ymax+1)*N−1). Therefore, transformations from the coordinates (X,Y) to address Mem_addr are performed by the following equation:

$$Mem\_addr = A + Y*N + FL(X/16) \qquad (7)$$

where FL(r) is the greatest integer that does not exceed r. At the same time, the coordinates (X,Y) can be transformed to bit position Bit_pos in a word by:

$$Bit\_pos = Mod16(X) \qquad (8)$$

where Mod16 is the residuum of 16.

When using the drawing memory described above, the registers and incrementer/decrementer 32 shown in FIG. 5 are set to the following initial values, provided that the coordinates of the start point are $P_O(X_O, Y_O)$:

first line register 27: N
second line register 28: N−1
address register 31: $A + Y_O*N + FL(X_O/16)$
incrementer/decrementer 32: $Mod16(X_O)$ where N denotes the number of words in one line. Since it is assumed here that a word in the drawing memory is composed of 16 bits, the incrementer/decrementer 32 needs only 4 bits in order to store the value of Mod16.

Table 2 lists the control signals generated by the control circuit 33 on the basis of the output from the direction control circuit 11 and the all 0 and all 1 signals produced from the incrementer/decrementer 32.

TABLE 2

| Outputs of direction control circuit (X_Plus, X_Minus, Y_Plus) | Values of all 1 and all 0 signals | Operations in the adder/subtractor (ADR is the current address) | cin, add/sub, inc, dec | Second input to adder/subtractor |
|---|---|---|---|---|
| 0000 | —,— | ADR | 0,1,0,0 | constant register |
| 1000 | —,0 | ADR | 0,1,1,0 | " |
| 1000 | —,1 | ADR + 1 | 1,1,1,0 | " |
| 0100 | 0,— | ADR | 0,1,0,1 | " |
| 0100 | 1,— | ADR − 1 | 0,0,0,1 | " |
| 0010 | —,— | ADR + N | 0,1,0,0 | line register 1 |
| 0001 | —,— | ADR − N | 1,0,0,0 | " |
| 1010 | —,0 | ADR + N | 0,1,1,0 | " |
| 1010 | —,1 | ADR + N + 1 | 1,1,1,0 | " |
| 0110 | 0,— | ADR + N | 0,1,0,1 | " |
| 0110 | 1,0 | ADR + N − 1 | 0,1,0,1 | line register 2 |
| 1001 | —,0 | ADR − N | 1,0,0,0 | line register 1 |
| 1001 | —,1 | ADR − N + 1 | 1,0,1,0 | line register 2 |

TABLE 2-continued

| Outputs of direction control circuit (X_Plus, X_Minus, Y_Plus) | Values of all 1 and all 0 signals | Operations in the adder/ subtractor (ADR is the current address) | cin, add/ sub, inc, dec | Second input to adder/ subtractor |
| --- | --- | --- | --- | --- |
| 0101 | 0,— | ADR − N | 1,0,0,1 | line register 1 |
| 0101 | 1,— | ADR − N − 1 | 0,0,0,1 | " |

("—" means "don't care")

The control circuit 33 generates control signals CIN and ADD/SUB, INC and DEC signals, and various other control signals on the basis of Table 2. The control circuit 33 also selects only one of the three registers as the second input to the adder/subtractor on the basis of Table 2.

According to the present invention, various line segments can be drawn by merely allowing the CPU to set appropriate constants in the coordinate computing circuit. Hence, there is no need to provide separate circuits in association with the types of curves and straight lines to be drawn and this contributes to scale reduction of hardware.

Further, the direction control circuit provided in addition to the coordinate computing circuit allows for finer control over the direction in which a dot of interest is moving.

Another advantage of the present invention is that the sequence of operations from the calculation of coordinates up to address generation is implemented by a pipeline process, so addresses in the drawing memory can be obtained at high speed in response to each output clock.

What is claimed is:

1. A graphics microcomputer having a central processing unit, comprising:

an Nth-order polynomial computing circuit which receives constants from said central processing unit to compute consecutively X and Y coordinates of a point on a line segment to be drawn as values of Nth-order polynomials, each pair of X and Y coordinates produced in response to an output clock signal;

a first latch circuit in which the value of the X coordinate produced from said Nth-order polynomial computing circuit is latched for one period of the output clock signal before being outputted;

a second latch circuit in which the value of the Y coordinate produced from said Nth-order polynomial computing circuit is latched for one period of the output clock signal before being outputted;

a direction control circuit which receives the vales of the X and Y coordinates produced from said Nth-order polynomial computing circuit and the outputs of said first and second latch circuits to output a direction of movement in units of dots in accordance with predetermined rules; and an address generating circuit, which receives the direction of movement as an output from said direction control circuit, and computes, in response to each output clock signal, an address of a word containing the dot to be written.

2. The graphics microcomputer as defined in claim 1 wherein the X and Y coordinates of the point on the line segment are expressed by $$P_x(t) = A_N * t^N + A_{N-1} * t^{N-1} + \ldots + A_1 * t + A_0 \tag{1}$$

$$P_y(t) = B_N * t^N + B_{N-1} * t^{N-1} + \ldots + B_1 * t + B_0 \tag{2}$$

where $A_N, A_{N-1}, \ldots B_0$ are constants, t is a parameter that satisfies the condition $0 \leq t \leq 1$, and N, which is the degree of a curve, is a positive integer.

3. The graphics microcomputer as defined in claim 1 wherein said Nth-order polynomial computing circuit includes: an X coordinate computing circuit for computing the X coordinate; a Y coordinate computing circuit for computing the Y coordinate; a signal line to be supplied with a new X coordinate; a counter; and a circuit for controlling the coordinate computing circuits, each of said X and Y coordinate computing circuits including a first adder receiving the values of a constant register and a second-order differential register to output the result of addition to said second-order differential register, a second adder receiving the values of said second-order differential register and a first-order differential register to output the result of addition to said first-order differential register, a third adder receiving the values of said first-order differential register and an X coordinate register to output the result of addition to said X coordinate register, and a latch circuit receiving a code bit that is the MSB (most significant bit) of said first-order differential register, said latch circuit holding its value for the cycle period of one output clock signal to output an x direction signal that indicates the direction of movement of a new X coordinate and said X coordinate register outputting the held value to said signal line.

* * * * *

UNITED STATES PATENT AND TRADEMARK OFFICE
CERTIFICATE OF CORRECTION

PATENT NO. : 5,261,034
DATED : November 09, 1993
INVENTOR(S) : Tetsuro Kawata

It is certified that error appears in the above-indentified patent and that said Letters Patent is hereby corrected as shown below:

Abstract, title page, line 1, before "provided" insert --is--.

*Claim 1, column 10, line 3, change "vales" to --values--.

*Claim 2, column 10, equations, change "t... t" to --t ... t-- (both occurrences).

*Claim 2, column 10, equations, after "$A_o$" and "$B_o$" insert ".....".

Signed and Sealed this

Twentieth Day of September, 1994

Attest:

BRUCE LEHMAN

Attesting Officer

Commissioner of Patents and Trademarks